Figure 1:
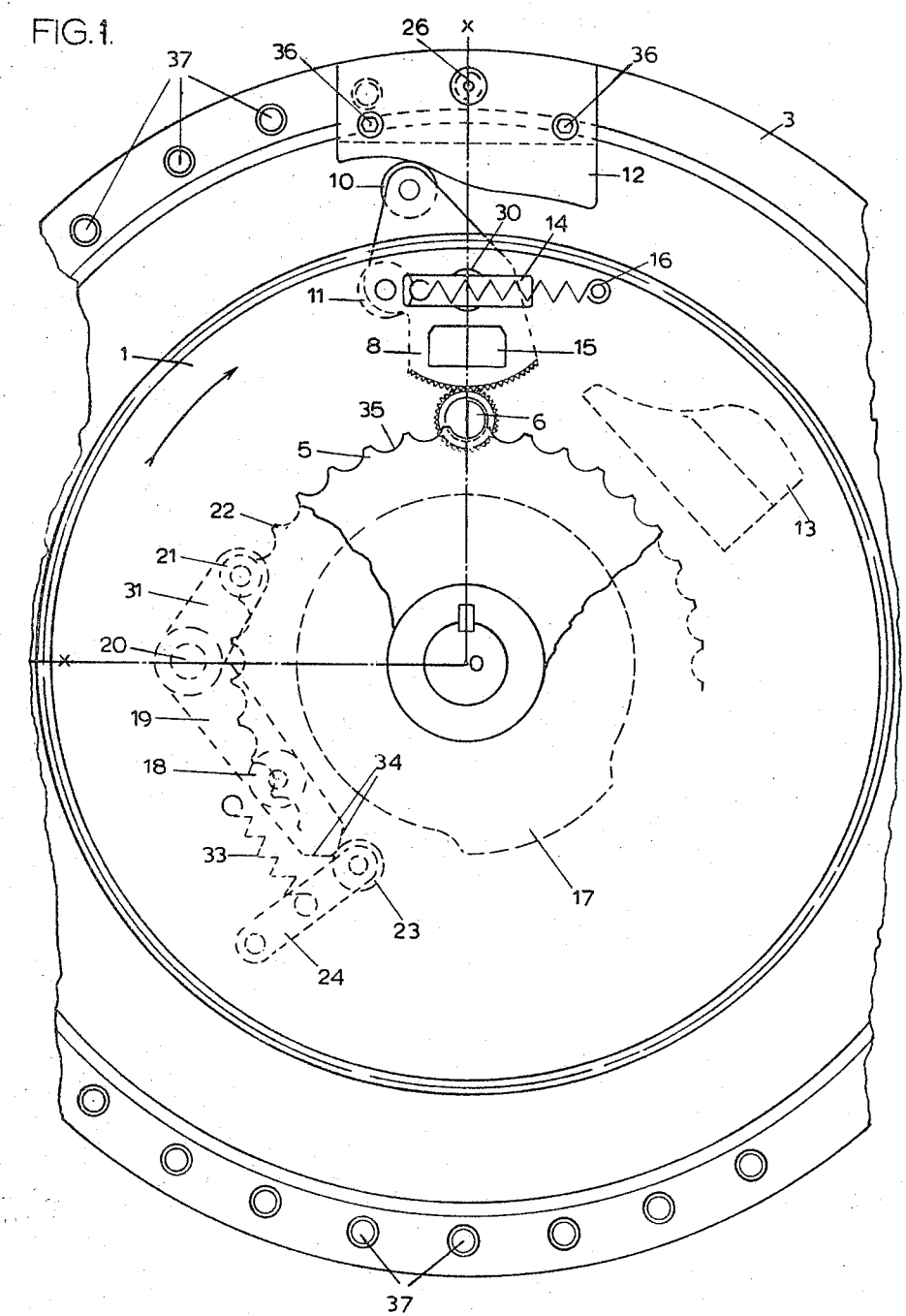

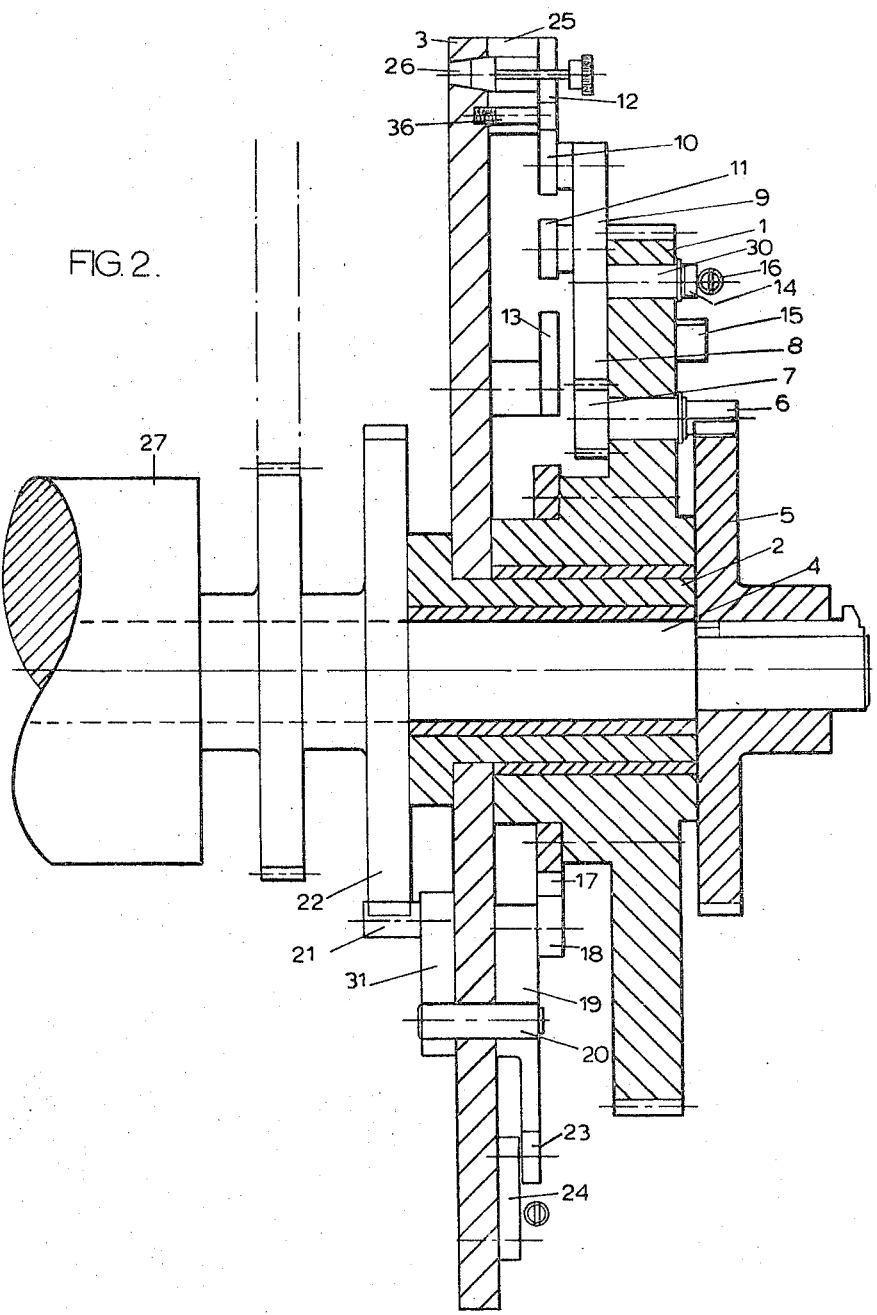

3,301,076
INTERMITTENT DRIVE MECHANISMS FOR A
PRINTING MACHINE WEB FEED ROLL
Angus Murray Halley, Birmingham, England, assignor to James Halley & Sons Limited, Stafford, England, a British company
Filed Dec. 14, 1964, Ser. No. 417,984
Claims priority, application Great Britain, Dec. 20, 1963, 50,564/63
8 Claims. (Cl. 74—125.5)

This invention relates to intermittent drive mechanisms particularly, but not exclusively, for use in paper web or sheet processing apparatus for varying the rate of movement of the web or sheets between two different uniform rates in a cycle of operation.

The object of the invention is an intermittent drive mechanism of particularly rugged construction and capable of rapid change between its driving and non-driving conditions.

According to the invention an intermittent drive mechanism comprising a rotatable driving member; a rotatable driven member; and means for intermittently establishing drive between said members comprising a wheel having a plurality of recesses in its periphery and rotatable with said driven member, an element pivotally mounted on the driving member, and actuating means operatively connected to said element for pivoting said element between a first position in which the element has drive transmitting engagement with a recess in the wheel periphery and a second position out of such engagement.

One typical example of the practical realization of the invention is illustrated in the accompanying drawings, wherein:

FIGURE 1 is a front elevation of an intermittent drive mechanism according to the invention, and FIGURE 2 is a sectional side elevation taken generally along the line XOX of FIGURE 1, but with some departure from these lines to more clearly show the operative relationship between certain of the parts of FIGURE 1.

In the drawings a driving member 1 comprises a gear wheel rotatably mounted on a fixed sleeve 2 carried in the machine frame 3. A driven member comprises a shaft 4 journalled within the sleeve 2 to rotate co-axially with the driving member 1. A wheel 5 (herein called the recessed wheel) keyed to the driven shaft 4 has semi-circular recesses 35 in and evenly spaced about its periphery. An element 6 takes the form of a bolt pivotally mounted on the driving member 1 and incorporates a semi-circular head of radius approximately equal to that of the recesses in the wheel 5. When the bolt head 6 lies wholly within a recess 35 of the wheel 5 the bolt forms a positive bridging connection between the driving member 1 and the recessed wheel 5 on the driven member 4, whereas when the bolt 6 is turned through 180° from this bridging position then the flat side of the bolt head is presented towards but clears the periphery of the recessed wheel 5 so as to isolate the rotating driving member 1 from the driven member 4. FIGURE 1 shows the bolt 6, and also its actuating means hereinafter described, midway between these two alternative bridging and isolating positions.

For the actuation of the bolt 6 a pinion 7 integral therewith meshes with a gear segment 8 journalled on pin 30 in driving member 1. An extension 9 of segment 8 carries two cam followers 10 and 11. In rotation of driving member 1, cam follower 10 (referred to as the engaging follower) co-acts with a cam 12 mounted on the frame 3 to pivot bolt 6 to its bridging position. Subsequently cam follower 11 (referred to as the disengaging follower) co-acts with a cam 13 mounted on the frame 3 to return bolt 6 to its isolating position.

To locate the element 6 in its alternative positions an arm 14 is fixed to the gear segment journal 30. A tension spring 16 is anchored to the driving member 1 and attached to the end of the arm 14 on the opposite side of journal 30 to the spring anchorage. By the over-centre action of the spring and arm, segment 8 is biased to one or other of its two positions corresponding with the two positions of the bolt 6 in which one or other of the bevelled corners of a lug 15 on segment 8 abut arm 14.

Locking means is provided for positively arresting the driven member 4 when it is not being driven from the driving member 1. This locking means comprises a profile cam 17 rotatable with driving member 1 and co-acting with a cam follower 18 on a lever arm 19 secured to a pin 20 pivotally mounted in frame 3. A second lever arm 31 also secured to the pivot pin 20 carries a locking roller 21 co-acting with semi-circular recesses in a locking wheel 22 similar to and rotatable with toothed wheel 5. The arrangement of these parts is such that as bolt 6 disengages from one of the recesses of the recessed wheel 5, so the leading part of the cam 17 engages follower 18 to turn lever arms 19 and 31 and engage roller 21 with one of the recesses in the locking wheel 22 and thereby positively and rapidly arrest the driven member 4.

To locate the foregoing locking means in either of its alternative positions of engagement and disengagement from the locking wheel 22, a roller 23 is mounted on an arm 24 pivoted on frame 3 and a tension member 33 biases roller 23 to engage one or other of the alternative flat faces 34 of the nose of lever arm 19. The engagement between roller 23 and alternative faces 34 is such that the impulse provided by the engagement of bolt 6 with the recessed wheel 5 is sufficient to release the locking roller 21 from the locking wheel 22 and to position lever 19 in its unlocking position. Instead of separate recessed and locking wheels 5 and 22, it is envisaged that their functions could be fulfilled by a single recessed wheel co-acting with both the bolt and the locking means.

To admit of adjustment of the phasing of the intermittent drive of the driven member 4 with the continuous rotation of driving member 1, the engaging cam 12 is mounted on a carrier 25 having a plug and slot connection 26 with any one of a number of angularly spaced positions 37 on the frame 3 disposed co-axially about the driving member 1, these alternative positions being spaced at equal angular intervals corresponding to those of the recesses in the toothed and locking wheels 5 and 22. At each of these alternative positions the carrier 25 can be fastened to the frame by bolts 36.

In one example of the practical application of the above described intermittent drive mechanism, the mechanism is incorporated in the web transporting system of the printing machine described in U.S. Patent No. 1,052,-182 to provide an intermittent drive to the web feeding rollers 27 on both sides of the printing nip during continuous rotation of the printing and impression cylinders. The mechanism is adjusted so that bolt 6 assumes its drive isolating position and the locking roller 21 engages with the locking wheel 22 when the drive of the web feeding rollers 27 is to be terminated. The position of the engagement cam 12 is then adjusted to rotate bolt 6 to its bridging position at the instant at which rotaion of the web feeding rollers 27 is required.

Conveniently the angular intervals of the alternative positions of cam 12 and the recesses in the wheels 5 and 22 correspond with half inch increments of length of feed of web transported by the feed rollers 27 and thus in correspondence with the half inch intervals between the maginally punched holes of conventional continuous stationary.

I claim:
1. An intermittent drive mechanism comprising a rotatable driving member; a rotatable driven member; and means for intermittently establishing drive between said members comprising:
  (a) a wheel having a plurality of semi-circular recesses in its periphery and rotatable with the driven member,
  (b) an element rotatably mounted on the driving member and having a semi-circular section complementary to the shape of each recess in the periphery of said wheel, and
  (c) actuating means operatively connected to said element for rotating said element between a first position in which the element has drive transmitting engagement with a recess in the wheel periphery and a second alternative position out of such engagement comprising:
    (c1) a fixed frame,
    (c2) an oscillatable member mounted on the driving member and geared with said element, and
    (c3) at least one cam mounted on the fixed frame and arranged to actuate said oscillatable member to rotate said element to at least one of its two alternative positions.

2. An intermittent drive mechanism according to claim 1, and comprising a further cam mounted on the frame and spaced from the first cam so that the two cams serve respectively to rock the oscillatable member and element between their two alternative positions.

3. An intermittent drive mechanism according to claim 2, wherein at least one of the cams is adapted for mounting in any one of a plurality of positions spaced angularly about the driving and driven members.

4. An intermittent drive mechanism according to claim 2 and comprising locating means for locating said oscillatable member in each of two positions corresponding with the two alternative positions of the element.

5. An intermittent drive mechanism according to claim 1 and comprising locking means for arresting the driven member whilst said element is out of engagement with the recessed wheel.

6. An intermittent drive mechanism according to claim 5, wherein a second recessed wheel is provided rotatable with the first named recess wheel, and said locking means comprises a locking member selectively engageable with said second recessed wheel.

7. An intermittent drive mechanism according to claim 6, wherein said locking member comprises a lever having two abutments one engageable with said second recessed wheel and the other engageable with a cam rotating with the driving member.

8. An intermittent drive mechanism according to claim 6, and comprising means for locating the locking means in either of two alternative positions of engagement with and disengagement from said second recessed wheel.

References Cited by the Examiner

UNITED STATES PATENTS

| 1,954,734 | 4/1934 | Harries | 226—157 X |
| 2,517,473 | 8/1950 | Filarski | 192—29 |
| 2,584,195 | 2/1952 | Evans | 226—157 |
| 2,889,712 | 6/1959 | Early | 74—125.5 |
| 2,998,760 | 9/1961 | Allen | 226—156 X |
| 3,028,064 | 4/1962 | Thurlings | 226—188 X |

FOREIGN PATENTS

| 323,356 | 6/1920 | Germany. |
| 340,669 | 9/1921 | Germany. |
| 870,766 | 6/1961 | Great Britain. |

M. HENSON WOOD, JR., *Primary Examiner.*

V. C. WILKS, *Assistant Examiner.*